(12) United States Patent
Mercer et al.

(10) Patent No.: US 11,117,482 B2
(45) Date of Patent: Sep. 14, 2021

(54) CHARGING STATION WITH ARTICULATING PANELS

(71) Applicant: Volta Charging, LLC, San Francisco, CA (US)

(72) Inventors: Scott Mercer, Pacifica, CA (US); Kayla Matheus, San Francisco, CA (US)

(73) Assignee: Volta Charging, LLC, San Francisco, CA (US)

( * ) Notice: Subject to any disclaimer, the term of this patent is extended or adjusted under 35 U.S.C. 154(b) by 0 days.

(21) Appl. No.: 16/992,854

(22) Filed: Aug. 13, 2020

(65) Prior Publication Data
US 2020/0369169 A1    Nov. 26, 2020

Related U.S. Application Data

(63) Continuation of application No. PCT/US2020/032324, filed on May 11, 2020.
(Continued)

(51) Int. Cl.
*B60L 53/30* (2019.01)
*F16M 11/12* (2006.01)
(Continued)

(52) U.S. Cl.
CPC .......... *B60L 53/305* (2019.02); *F16M 11/126* (2013.01); *G06F 1/1605* (2013.01);
(Continued)

(58) Field of Classification Search
CPC ...... B60L 53/305; B60L 53/66; H02J 7/0027; H02J 2310/48; Y02T 90/12;
(Continued)

(56) References Cited

U.S. PATENT DOCUMENTS 6,212,734 B1    4/2001    Commons
7,375,954 B2 *  5/2008    Yang ..................... G06F 1/1616
                                                          248/920

(Continued)

FOREIGN PATENT DOCUMENTS

DE    102011056651 A1    6/2013
WO    WO2010/143039 A1   12/2010

OTHER PUBLICATIONS

Volta Charging, LLC, International Search Report and Written Opinion, PCT/US2020/032324, dated Jul. 29, 2020, 17 pgs.

*Primary Examiner* — Christopher Garft
*Assistant Examiner* — Michael McDuffie
(74) *Attorney, Agent, or Firm* — Morgan, Lewis & Bockius LLP

(57) ABSTRACT

An electric vehicle (EV) charging station includes a frame and a panel having an interior surface and an exterior surface. The panel is hinged to the frame so as to articulate the panel away from the frame. The panel includes a display facing outwardly from the exterior surface of the panel and mounted on the interior surface of the panel. The EV charging station further includes a computer accessible when the panel is articulated away from the frame, the computer including one or more processors and memory, the memory storing instructions for displaying content on the display.

29 Claims, 3 Drawing Sheets

Related U.S. Application Data

(60) Provisional application No. 62/847,165, filed on May 13, 2019.

(51) Int. Cl.
  *G06F 1/16* (2006.01)
  *G09F 19/02* (2006.01)

(52) U.S. Cl.
  CPC ............ *G06F 1/1607* (2013.01); *G09F 19/02* (2013.01); *F16M 2200/02* (2013.01); *H02J 2310/48* (2020.01)

(58) Field of Classification Search
  CPC ............ F16M 11/126; F16M 2200/02; G06F 1/1605; G06F 19/02; G05F 1/1607
  USPC .................................. 320/109; 248/919–923
  See application file for complete search history.

(56) References Cited

U.S. PATENT DOCUMENTS

| | | | |
|---|---|---|---|
| 7,408,596 B2 * | 8/2008 | Kunz | B60P 3/34 348/837 |
| 7,804,274 B2 | 9/2010 | Baxter et al. | |
| 7,869,201 B2 * | 1/2011 | McCoy | F16M 11/2092 361/679.07 |
| 7,997,550 B2 * | 8/2011 | Kuhn | F16M 11/2064 248/276.1 |
| 8,018,716 B2 * | 9/2011 | McCoy | F16M 11/08 361/679.07 |
| 8,042,778 B2 * | 10/2011 | Wu | F16M 11/08 248/282.1 |
| 8,102,333 B2 * | 1/2012 | Kondo | G06F 3/1446 345/1.3 |
| 8,313,072 B2 * | 11/2012 | Bakkom | F16M 11/105 248/289.11 |
| 8,922,981 B2 * | 12/2014 | Leigh | H05K 7/1494 361/679.01 |
| 8,975,863 B2 * | 3/2015 | Ranga | B60L 53/31 320/109 |
| 9,061,597 B2 * | 6/2015 | Oda | B60L 53/11 |
| 9,148,003 B2 | 9/2015 | Beck et al. | |
| 9,158,135 B1 * | 10/2015 | Chaboud | G02F 1/0102 |
| 9,180,783 B1 * | 11/2015 | Penilla | B60L 53/14 |
| 9,597,970 B2 | 3/2017 | DeBoer, III et al. | |
| 10,173,544 B2 | 1/2019 | Hendrix et al. | |
| 10,850,713 B2 * | 12/2020 | O'Hora | B25J 15/00 |
| 10,881,010 B2 * | 12/2020 | Kim | E05D 5/02 |
| 10,908,652 B2 * | 2/2021 | Maatta | E05D 7/00 |
| 2002/0135535 A1 * | 9/2002 | Muller | G06F 1/1616 345/1.1 |
| 2004/0195471 A1 * | 10/2004 | Sachen, Jr. | F16M 11/10 248/127 |
| 2006/0118694 A1 * | 6/2006 | Lee | F16M 11/24 40/711 |
| 2007/0138356 A1 * | 6/2007 | Johansson | G09F 15/00 248/125.1 |
| 2007/0175837 A1 * | 8/2007 | Furman | G06F 1/181 211/26 |
| 2008/0010908 A1 * | 1/2008 | Mortier | H05K 5/0226 52/32 |
| 2008/0123284 A1 * | 5/2008 | Jaramillo | H05K 7/1494 361/679.1 |
| 2008/0262649 A1 * | 10/2008 | Allinson | G16H 20/13 700/235 |
| 2011/0014501 A1 * | 1/2011 | Scheucher | B60L 53/11 429/7 |
| 2011/0140656 A1 * | 6/2011 | Starr | B60L 53/31 320/109 |
| 2011/0174875 A1 * | 7/2011 | Wurzer | B60L 53/31 235/380 |
| 2011/0227531 A1 * | 9/2011 | Rajakaruna | B60L 53/305 320/109 |
| 2013/0020991 A1 * | 1/2013 | DeBoer | B60L 53/65 320/109 |
| 2013/0076597 A1 * | 3/2013 | Becze | G06F 1/1618 345/1.3 |
| 2016/0134140 A1 * | 5/2016 | Tittle | H02J 1/08 320/101 |
| 2016/0193932 A1 | 7/2016 | Vaghefinazari | |
| 2016/0297315 A1 * | 10/2016 | Gonzalez | G01R 31/3648 |
| 2016/0300424 A1 * | 10/2016 | Jones | G07F 15/006 |
| 2017/0237944 A1 | 8/2017 | Haas | |
| 2017/0256115 A1 * | 9/2017 | Diaz | G07F 11/00 |
| 2017/0324908 A1 * | 11/2017 | Gharabegian | A45B 25/14 |
| 2019/0016312 A1 | 1/2019 | Carlson et al. | |
| 2019/0118782 A1 * | 4/2019 | O'Hora | B25J 11/00 |
| 2019/0302764 A1 * | 10/2019 | Smith | B60R 25/23 |
| 2020/0228057 A1 * | 7/2020 | Roberts | H02S 40/32 |
| 2020/0247261 A1 * | 8/2020 | Kojima | H02J 7/007188 |
| 2020/0391601 A1 * | 12/2020 | Maeshiro | B60L 53/302 |

* cited by examiner

CHARGING STATION WITH ARTICULATING PANELS

RELATED APPLICATIONS

This application is a continuation application of PCT App. No. PCT/US20/32324, filed May 11, 2020, which claims priority to U.S. Prov. App. No. 62/847,165, filed May 13, 2019, each of which is hereby incorporated by reference in its entirety.

TECHNICAL FIELD

This application is related to mechanical structures for electric vehicle charging stations.

BACKGROUND

As electric vehicles become more prevalent, there is an increased need for charging stations. Many of these charging stations are in public places, such as parking lots for retail areas, office buildings, and on public streets. These areas often have a large volume of vehicle and pedestrian traffic, and as such, are ideal locations for advertising. Thus, there is an opportunity to convey advertising information via electric vehicle charging stations, both to users of the charging stations and to passers-by.

SUMMARY

There is a need for electric vehicle charging stations that convey information to passersby (e.g., at a distance). Some embodiments of the present disclosure provide an electric vehicle (EV) charging station with a frame and one or more panels that hold a display. The displays are large compared to the overall size of the frame (e.g., 60% or more of the height of the frame and 80% or more of the width of the frame), allowing the displays to convey information to passersby. In some embodiments, the displays are incorporated into articulating panels that articulate away from a frame (e.g., a sub-frame). The articulating panels solve the technical problem of the need for maintenance of the displays (as well as one or more computers that control content displayed on the display). To that end, the articulating panels provide easy access to the entire back of the displays. In addition, in some embodiments, the remaining space between the articulating panels (e.g., within the frame) is hollow, allowing for ample airflow and cooling of the displays.

To that end, an electric vehicle charging station (EVCS) is provided. The EVCS includes a frame; an electrical connector coupled to the frame for supply electrical charge to an electrical vehicle; a panel having a display facing outwardly from the exterior surface of the panel and mounted on the interior surface of the panel; and a hinge having two states, closed and open. The panel is hinged to the frame so as to articulate the panel away from the frame and the hinge supports a display on the panel. The EVCS further includes a computing device accessible when the panel is articulated away from the frame, the computing device including one or more processors and memory, the memory storing instructions for displaying content on the display.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Figure 1:
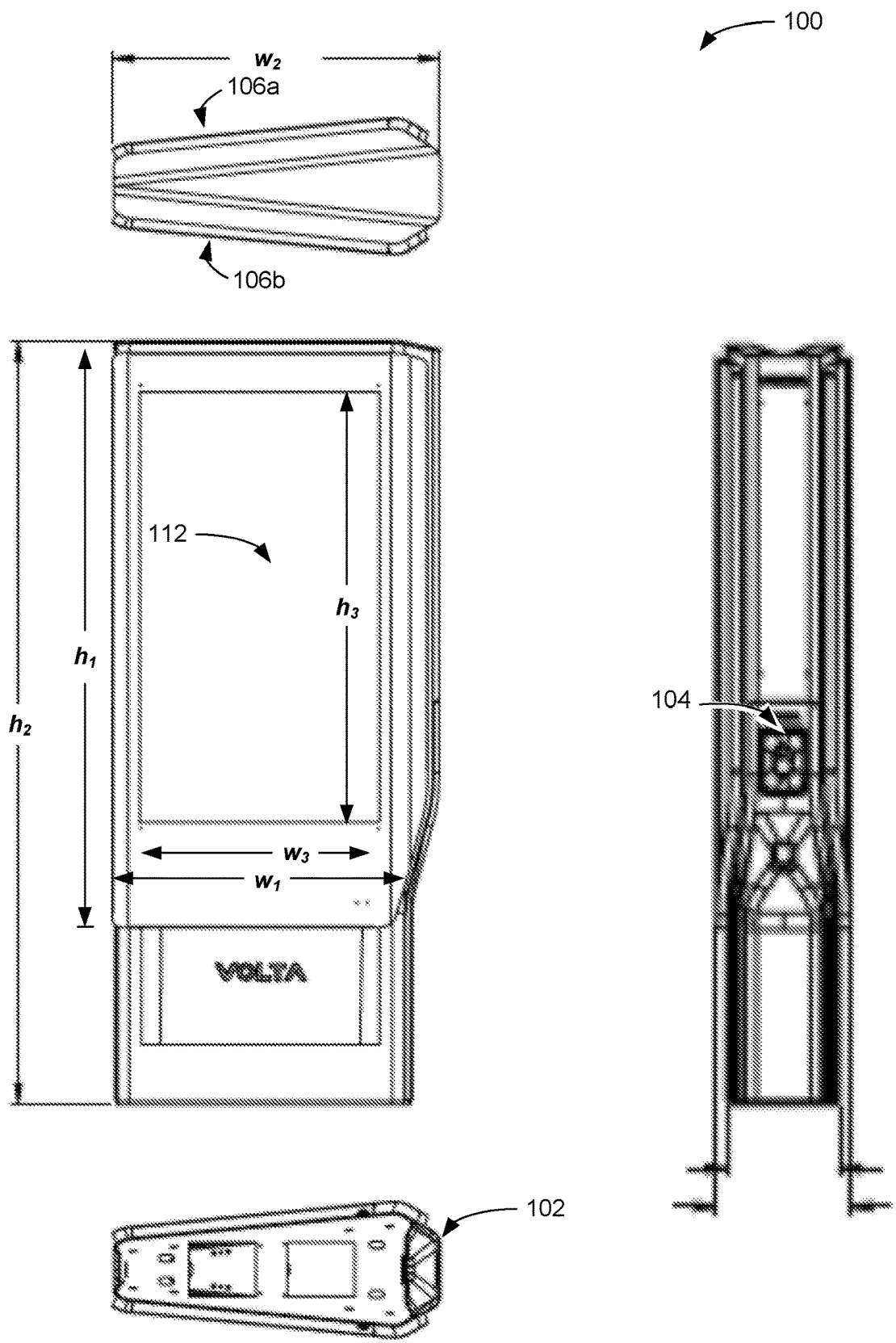
FIG. 1 is a mechanical drawing showing various views of an electric vehicle charging station, in accordance with some embodiments.
Figure 2:
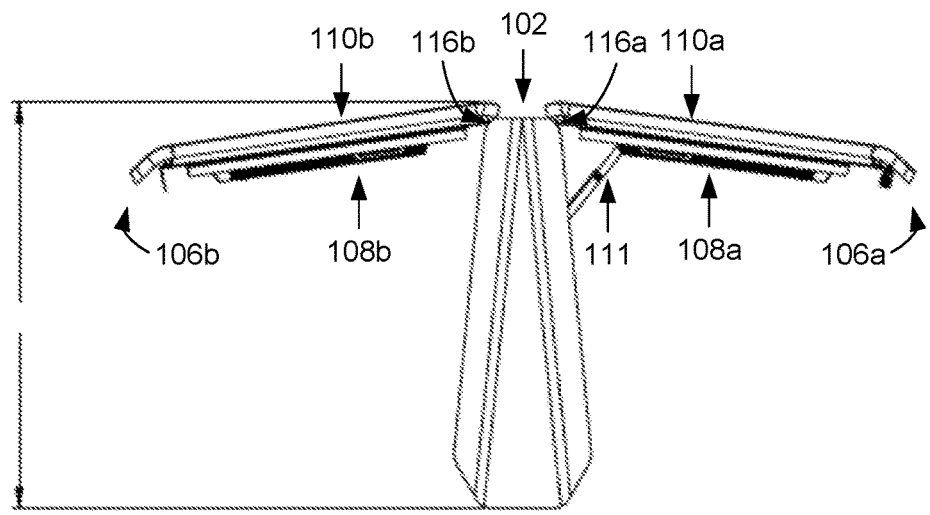
FIG. 2 is a mechanical drawing showing additional views of the electric vehicle charging station of FIG. 1, in accordance with some embodiments.
Figure 2:
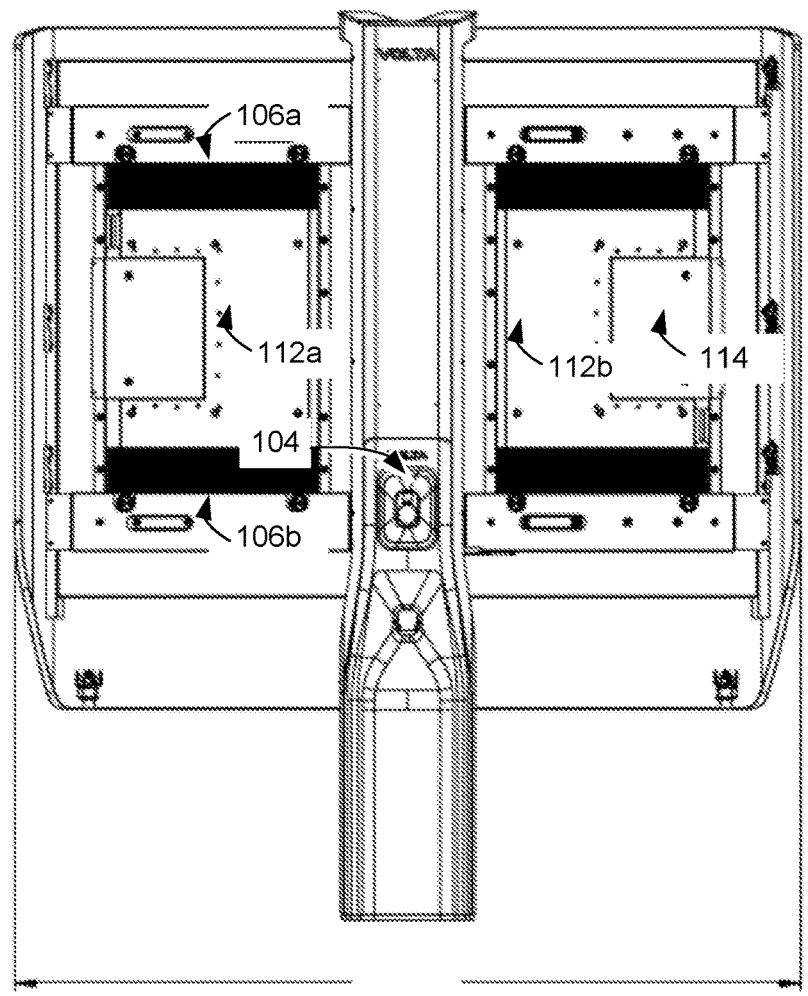

FIG. 1 is a mechanical drawing showing various views of an electric vehicle (EV) charging station 100, in accordance with some embodiments. FIG. 2 is a mechanical drawing showing additional views of the electric vehicle charging station 100 of FIG. 1, in accordance with some embodiments. FIGS. 1-2 are discussed together below.

EV charging station 100 includes a frame 102 (e.g., a body or a chassis) including an electrical connector 304 (e.g., including a charging cable extending from the frame) configured to connect and provide a charge to an electrical vehicle. For visual clarity, the connector is not shown in FIGS. 1-2. However, in some embodiments, the connector is a "gun-type" connector (e.g., a charge gun) that, when not in use, sits in a holder 104 (e.g., a holster). For example, the electrical connector 304 is removed from the holder to be connected to an electric vehicle. In some embodiments, the frame 102 houses circuitry (e.g., electrical components 303) for charging an electrical vehicle. An example of a suitable connector is an IEC 62196 type-2 connector. For example, in some embodiments, the frame 102 includes power supply circuitry as well as circuitry for determining a state of a vehicle being charged (e.g., whether the vehicle is connected via the connector, whether the vehicle charging, whether the vehicle is done charging, etc.).

The EV charging station 100 further includes a panel 106a having an interior surface 108a and an exterior surface 110a. The panel 106a is hinged to the frame 102 so as to articulate (e.g., rotate) the panel 106a away from the frame 102. In some embodiments, as shown, an axis of rotation of the panel 106a (e.g., provided by the hinge) is substantially vertical (e.g., the panel 106a opens to the side). In some embodiments, an axis of rotation of the panel 106a is substantially horizontal (e.g., the panel flips upward). In some embodiments, the hinge is located on a narrow side of the EV charging station 100. In some embodiments, the hinge is located on a wide side of the EV charging station. In some embodiments, the hinge is located on a top or bottom of the EV charging station. In some embodiments, the panel weighs at least 15 kilograms (kg), at least 20 kg, at least 30 kg, or at least 35 kg. The panel is coupled to the charging station by one or more hinges, including the aforementioned hinge, and the hinges are design to support the weight of the panel. In some embodiments, the interior surface of the panel overlaps with the frame (e.g., to prevent tampering and vandalism) by at least 2 mm, at least 5 mm, at least 10 mm, at least 15 mm, or at least 25 mm.

In some embodiments, panels 106a and 106b are attached to the frame using lift-off hinges 116a and 116b (e.g., removable lift-off hinges) for rotation and removal. In some embodiments, the lift-off hinges push the panel 106a away from the station (e.g., the frame) as the panels are rotated about the hinge axis. In some embodiments, the hinges have at least two states, including a closed state and an open state. For example, the hinges are in a closed state when the hinges are retracted (rotated towards the frame) and the panel is held against the frame of the station. The hinges are in an open state when the panel is rotated away from the frame. In some embodiments, two bars 111 connected to the frame and the panel act as a four-bar mechanism limiting the panel from opening beyond a predefined threshold angle (e.g., 85 degrees). In some embodiments, the EV charging station 100 includes an automatic opening mechanism (e.g., pneumatic cylinders to assist in opening panel 106a).

The panel 106a includes an electronic display 112a facing outwardly from the exterior surface 110a of the panel 106a and mounted on the interior surface 108a of the panel 106a. In some embodiments, the panel 106a does not include the display 112a but is configured, mechanically and with appropriate electrical connections, to mount display 112a. In some embodiments, the exterior surface 110a of the panel 106a includes a transparent surface (e.g., such that the display 112a can be viewed through the transparent surface). In some embodiments, the transparent portion is made of tempered glass to protect from tampering and/or vandalism. The EV charging station 100 further includes a computer 114 accessible (e.g., only accessible) when the panel 106a is articulated (e.g., rotated) away from the frame 102 (e.g., the door is open). The computer 114 includes one or more processors and memory (not shown). The memory stores instructions for displaying content on the display 112a. In some embodiments, the computer 114 is mounted to the panel 106a.

In some embodiments, the panel 106a is a first panel. The electric vehicle charging station 100 further includes a second panel 106b substantially opposite the first panel having a second interior surface 108b and a second exterior surface 110b (e.g., when the two panels 106 are closed, the interior surface 108a faces the interior surface 108b). The second panel 106b is hinged to the frame 102 so as to articulate the second panel 108b away from the frame 102 as it rotates. For example, the two panels 106 articulate away from the frame 102 in substantially opposite directions (e.g., the panels 106 open away from each other as they rotate). The second panel 106b includes a second display 112b facing outwardly from the second exterior surface 110b of the second panel 106b and mounted on the second interior surface 108b of the second panel 106b.

In some embodiments, the EV charging station 100 further includes one or more heat sinks 116 (e.g., heat sink 116a and heat sink 116b) thermally coupled to the display 112a. In some embodiments, when the panels are closed, the frame 102 is substantially hollow between the first panel 106a and the second panel 106b (e.g., to allow for heat to dissipate via the heat sinks 116).

In some embodiments, the panel 106a (and/or panel 106b) has a height $h_1$ that is at least 60% of a height $h_2$ of the frame 102 and a width $w_1$ that is at least 90% of a width 1422 of the frame. In some embodiments, the panel 102 has a height $h_1$ that is at least 3 feet and a width $w_1$ that is at least 2 feet.

In some embodiments, the display 112 has a height $h_3$ that is at least 60% of a height $h_2$ of the frame 102 and a width $w_3$ that is at least 90% of a width $w_2$ of the frame 102. In some embodiments, the display 112 has a height $h_3$ that is at least 3 feet and a width $w_3$ that is at least 2 feet.

In some embodiments, the computer includes or is coupled to one or more sensors (e.g., sensor(s) 301), such as a near-field communication (NFC) sensor (not shown) configured to interact with a user's device (e.g., a user of the EV charging station 100).

In some embodiments, the frame 102 includes one or more lights (e.g., light source(s) 305). For example, the one or more lights are illuminated in association with the one or more display(s) 112. For example, the one or more lights change color in accordance with colors included in the content displayed on the display(s). In some embodiments, the one or more lights are illuminated in accordance with a status of the EV charging station. For example, when the EV charging station is available, but not in use, the one or more lights are illuminated in a particular sequence and/or with particular colors. In some embodiments, different states of the EV charging station cause the lights to be illuminated in different ways.

In some embodiments, the frame 102 includes one or more cameras (not shown). For example, the one or more sensor(s) 301 include optical sensors (e.g., cameras).

In some embodiments, the EV charging station 100 further includes a locking mechanism 118 to secure the panel 106a to the frame 102 such that the panel 106a cannot be articulated away from the frame 102 when the locking mechanism is locked. In some embodiments, the locking mechanism comprises of a rotary latch, actuator (e.g., push button that interfaces with the user) and/or a cable (e.g., that coupled the rotary latch with the actuator). The rotary latch engages with a striker bolt to lock and, by pressing the actuator, the cable transfers a mechanical input to release the actuator. In some embodiments, an edge of the lock is covered (e.g., to prevent someone from prying at the lock, e.g., with a crowbar). For example, the panels and EV charging station are designed to be resistant to weather and/or tampering.

In some embodiments, a user (e.g., someone servicing the station) enters a security code to unlock the lock. In some embodiments, an alarm system provides a notification (e.g., over a network, such as the internet) when the panels are tampered with or opened by an unauthorized user (e.g., without entering the security code).

Figure 3:
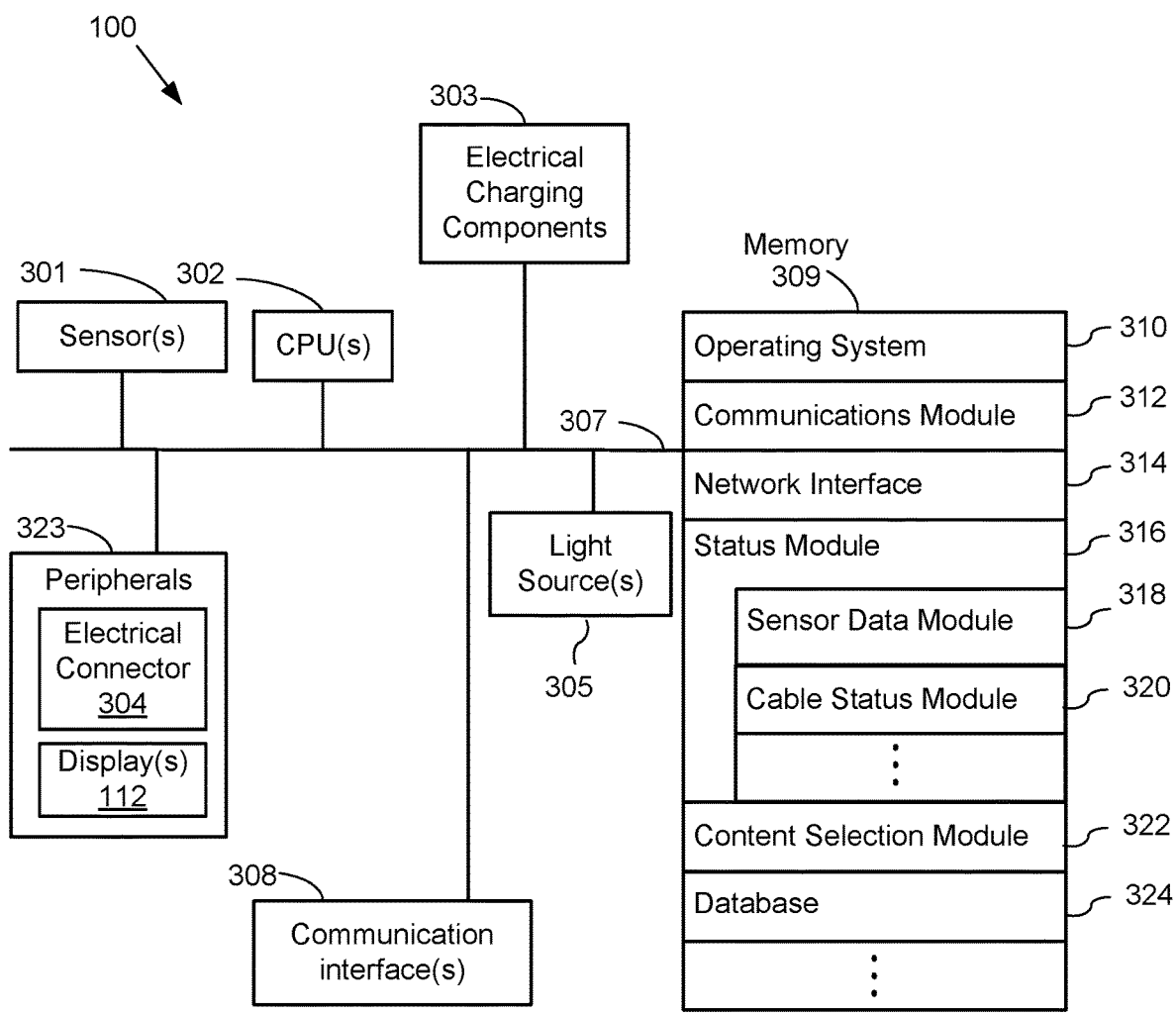
FIG. 3 is a block diagram illustrating an electric vehicle charging station, in accordance with some embodiments.

FIG. 3 illustrates a block diagram of electrical components an EV charging station 100. In some embodiments, the components of the EV charging station are housed within a frame 102 (FIGS. 1-2). The EV charging station includes one or more of:

One or more sensor(s) 301 for observing a predefined area proximal to the EV charging station, including one or more of:
An optical sensor (e.g., infrared and/or red, green, blue "IR/RGB" camera);
A near-field communication (NFC) sensor for communicating with one or more nearby user devices;

A motion sensor (e.g., a passive infrared (PIR) sensor);
A radiofrequency and/or infrared (RF/IR) sensor;
An ultrasound sensor;
A depth sensor;
A heat IR sensor; and
Radar;
One or more processors (e.g., CPU(s) 302) for executing one or more modules, programs, and/or instructions stored in the memory 214 and thereby performing processing operations stored in memory 309;
One or more electrical charging components 303 (e.g., circuitry), housed in frame 102, for providing electrical charge to an electric vehicle;
A peripherals 323, including:
  An electrical connector 304 for providing electrical charge to an electric vehicle;
  One or more display(s) 112 for displaying content selected by the content selection module 322;
Communication interface(s) 308 for communicating between the components of the EV charging station and operating system 310, in order to execute the programs stored in memory 309;
One or more light source(s) 305 for illuminating portions of the EV charging station in accordance with a state of the EV charging station;
One or more communication buses 307 for connecting the one or more communication interface(s) 308 to memory 309;
Memory 309 storing the following programs, modules, and data structures, or a subset thereof:
  Operating system 310, which includes procedures for handling various basic system services and for performing hardware dependent tasks;
  Communications module 312, which is used for connecting the EVCS 100 to other EV charging stations and devices via the one or more communication network interfaces 308 (wired or wireless) and one or more communication networks, such as the Internet, other wide area networks, local area networks, metropolitan area networks, and so on;
  Network interface 314 for connecting to a network to enable the EV charging station 100 to communicate with other EV charging stations that are connected to the network;
  Status module 316, including:
    Sensor data module 318 for receiving and/or processing data received from the one or more sensor(s) 301; and
    Cable status module 320 for receiving and/or processing data received from one or more sensor(s) couple with the electrical connector (and/or cable);
  Content selection module 322 to select content to be displayed on the one or more displays 112; and
  Database 324 for storing content (e.g., to be displayed on the display(s) 112) and/or information related to electric vehicles and/or users associated with the electric vehicles.
In some embodiments, the memory 309 includes high-speed random access memory, such as DRAM, SRAM, DDR RAM or other random access solid state memory devices. In some implementations, the memory 309 includes non-volatile memory, such as one or more magnetic disk storage devices, optical disk storage devices, flash memory devices, or other non-volatile solid state storage devices. In some implementations, the memory 309 includes one or more storage devices remotely located from the CPU(s) 302.

The memory 309, or alternatively the non-volatile memory device(s) within the memory 309, comprises a non-transitory computer-readable storage medium. Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 309 stores a subset of the modules and data structures identified above. Furthermore, the memory 309 may store additional modules or data structures not described above.

Although FIG. 3 shows an EV charging station 100, FIG. 3 is intended more as a functional description of the various features that may be present rather than as a structural schematic of the implementations described herein. In practice, and as recognized by those of ordinary skill in the art, items shown separately could be combined and some items could be separated.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described embodiments. The first widget and the second widget are both widget, but they are not the same condition unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An electric vehicle charging station, comprising:
   a frame;
   an electrical connector coupled to the frame for supplying an electrical charge to an electric vehicle;
   a first panel substantially opposite a second panel, having a first interior surface and a first exterior surface, wherein the first panel is hinged to the frame so as to articulate the first panel away from the frame, the first panel including a first electronic display facing outwardly from the first exterior surface of the first panel, and mounted on the first interior surface of the first panel;

a hinge having two states, a closed state and an open state, wherein:

the first panel is hinged to the frame so as to articulate the first panel away from the frame while the hinge is in the open state, and the hinge supports the first electronic display on the first panel;

a computing device accessible when the first panel is articulated away from the frame, the computing device including one or more processors and memory, the memory storing instructions for displaying content on the first electronic display; and the second panel substantially opposite the first panel having a second interior surface and a second exterior surface, wherein the second panel is hinged to the frame so as to articulate the second panel away from the frame, the second panel including a second electronic display facing outwardly from the second exterior surface of the second panel and mounted on the second interior surface of the second panel, wherein the first electronic display and the second electronic display face outward from the frame and in substantially opposite directions while the hinge is in the closed state.

2. The electric vehicle charging station of claim 1, wherein the first panel is hinged to the frame so as to articulate the first panel away from the frame about an axis of rotation that is substantially vertical.

3. The electric vehicle charging station of claim 1, wherein the first panel is hinged to the frame so as to articulate the first panel away from the frame about an axis of rotation that is substantially horizontal.

4. The electric vehicle charging station of claim 1, wherein the computer is mounted to the first panel.

5. The electric vehicle charging station of claim 1, wherein:

an axis of rotation of the first panel is substantially parallel to an axis of rotation of the second panel; and the first panel is configured to articulate away from the frame in a direction substantially opposite a direction in which the second panel is configured to articulate away from the frame.

6. The electric vehicle charging station of claim 1, further including one or more heat sinks thermally coupled to the first electronic display.

7. The electric vehicle charging station of claim 1, wherein the frame houses circuitry for charging an electric vehicle.

8. The electric vehicle charging station of claim 1, wherein the first panel has a height that is at least 60% of a height of the frame and a width that is at least 90% of a width of the frame.

9. The electric vehicle charging station of claim 1, wherein the first panel has a height that is at least 3 feet and a width that is at least 2 feet.

10. The electric vehicle charging station of claim 1, wherein the first electronic display has a height that is at least 60% of a height of the frame and a width that is at least 90% of a width of the frame.

11. The electric vehicle charging station of claim 1, wherein the first electronic display has a height that is at least 3 feet and a width that is at least 2 feet.

12. The electric vehicle charging station of claim 1, wherein the computer includes a near-field communication (NFC) sensor configured to interact with a device of a user of the electric vehicle charging station.

13. The electric vehicle charging station of claim 1, further including a lock to secure the first panel to the frame such that the first panel cannot be articulated away from the frame when the lock is locked.

14. The electric vehicle charging station of claim 1, wherein the exterior surface of the first panel includes a transparent portion that overlays the first electronic display.

15. An electric vehicle charging station, comprising:

a frame, wherein:

an interior of the frame forms a hollow region; and one or more lights are coupled to an exterior surface of the frame;

an electrical connector coupled to the frame for supplying electrical charge to an electric vehicle;

a first panel substantially opposite a second panel, having a first interior surface and a first exterior surface, wherein the first panel is hinged to the frame so as to articulate the first panel away from the frame, the first panel including a first electronic display facing outwardly from the first exterior surface of the first panel, and mounted on the first interior surface of the first panel;

a removable lift-off hinge having two states, a closed state and an open state, wherein:

the first panel is hinged to the frame so as to articulate the first panel away from the frame while the removable lift-off hinge is in the open state, and the removable lift-off hinge supports the first electronic display on the first panel;

a computing device accessible when the first panel is articulated away from the frame, the computing device including one or more processors and memory, the memory storing instructions for displaying content on the first electronic display, and controlling the one or more lights to indicate a state of the electric vehicle charging station;

one or more heat sinks thermally coupled to the first electronic display and configured to dissipate heat into the hollow region of the frame; and the second panel substantially opposite the first panel having a second interior surface and a second exterior surface, wherein the second panel is hinged to the frame so as to articulate the second panel away from the frame, the second panel including a second electronic display facing outwardly from the second exterior surface of the second panel and mounted on the second interior surface of the second panel, wherein the first electronic display and the second electronic display face outward from the frame and in substantially opposite directions while the removable lift-off hinge is in the closed state.

16. The electric vehicle charging station of claim 15, wherein the first panel is hinged to the frame so as to articulate the first panel away from the frame about an axis of rotation that is substantially vertical.

17. The electric vehicle charging station of claim 15, wherein the first panel is hinged to the frame so as to articulate the first panel away from the frame about an axis of rotation that is substantially horizontal.

18. The electric vehicle charging station of claim 15, wherein the computer is mounted to the first panel.

19. The electric vehicle charging station of claim 15, wherein:

an axis of rotation of the first panel is substantially parallel to an axis of rotation of the second panel; and the first panel is configured to articulate away from the frame in a direction substantially opposite a direction in which the second panel is configured to articulate away from the frame.

20. The electric vehicle charging station of claim 15, wherein the frame houses circuitry for charging an electric vehicle.

21. The electric vehicle charging station of claim 15, wherein the first panel has a height that is at least 60% of a height of the frame and a width that is at least 90% of a width of the frame.

22. The electric vehicle charging station of claim 15, wherein the first panel has a height that is at least 3 feet and a width that is at least 2 feet.

23. The electric vehicle charging station of claim 15, wherein the first electronic display has a height that is at least 60% of a height of the frame and a width that is at least 90% of a width of the frame.

24. The electric vehicle charging station of claim 15, wherein the first electronic display has a height that is at least 3 feet and a width that is at least 2 feet.

25. The electric vehicle charging station of claim 15, wherein the computer includes a near-field communication (NFC) sensor configured to interact with a device of a user of the electric vehicle charging station.

26. The electric vehicle charging station of claim 15, further including a lock to secure the first panel to the frame such that the first panel cannot be articulated away from the frame when the lock is locked.

27. The electric vehicle charging station of claim 15, wherein the exterior surface of the first panel includes a transparent portion that overlays the first electronic display.

28. The electric vehicle charging station of claim 10, wherein the frame includes one or more cameras.

29. The electric vehicle charging station of claim 15, wherein the frame includes one or more cameras.

* * * * *